United States Patent Office 3,591,519
Patented July 6, 1971

3,591,519
METHOD OF PREPARING HYDROPHOBIC SILICA
Francis J. Boylan, Limestone Gardens, Del., assignor to Hercules Incorporated, Wilmington, Del.
No Drawing. Filed Apr. 25, 1968, Ser. No. 724,258
Int. Cl. B01d
U.S. Cl. 252—321                                        7 Claims

ABSTRACT OF THE DISCLOSURE

Disclosed is a method of producing hydrophobic silica which comprises contacting a heated hydrocarbon-silica mixture with oxygen.

---

This invention relates to a method of preparing hydrophobic silica and to the hydrophobic silica thus produced.

Hydrophobic silica has utility as a thickening agent in the manufacture of water-resistant grease; see Pat. 2,920,042. Hydrophobic silica has utility also as a component of defoamer compositions; see Pat. 3,076,768.

Silica, normally hydrophilic, can be rendered hydrophobic by treatment with organo silicon halide vapors. Another method of rendering silica hydrophobic is disclosed and described in Pat. 2,657,149. These prior art methods have proved to be expensive.

In accordance with this invention there is provided a novel relatively inexpensive method of preparing silica particles that are hydrophobic, that is they are not wetted to any substantial degree by water.

The method of this invention comprises preparing an admixture of finely divided silica particles and at least one hydrocarbon that can be oxidized by oxygen at elevated temperatures, heating the resulting mixture at temperatures of from about 140° C. to about 300° C., and contacting the heated mixture with gaseous oxygen.

Hydrophilic silica particles that can be rendered hydrophobic in accordance with this invention include (1) silica aerogel, a colloidal silica which can be prepared by displacing water from a silica hydrogel by a low-boiling, water-miscible, organic liquid, heating in an autoclave or the like above the critical temperature of the liquid and then venting the autoclave; (2) so-called fumed silica, a colloidal silica derived by burning silicon tetrachloride and collecting the resulting silica smoke; and (3) a precipitated silica prepared by the disstabilization of a water-soluble silica under conditions which do not permit the formation of a gel structure, but rather cause the flocculation of silica particles into coherent aggregates such as by the addition of sodium ions to a sodium silicate solution.

The hydrophilic silica particles will desirably have an average particle size of less than about 10 microns and preferably less than about 5 microns. Most preferred are silica particles having an average particle size of from 0.02 micron to 1 micron. The silicas discussed above will have an average particle size of less than about 10 microns.

The hydrocarbons employed in this invention are water-insoluble, have a boiling point in excess of about 140° C., and can be oxidized by free, chemically uncombined oxygen at temperatures of from about 140° C. to about 300° C. and higher. Hydrocarbons that are liquid at room temperature (about 23° C.) are preferred for use in this invention. Hydrocarbons that are solid at room temperature can be employed satisfactorily provided they are fluid or liquid at a temperature of from about 140° C. to 300° C.

Suitable hydrocarbons include straight and branched chain hydrocarbons such, for example, as 2-methylnonane, nonane, decane, undecane, dodecane, tridecane, tetradecane, pentadecane, hexadecane, heptadecane, octadecane, nonadecane, eicosane, heneicosane, docosane, tricosane, tetracosane, pentacosane, hexacosane, heptacosane, octacosane, and 4-ethylheptane; alkyl substituted aromatic hydrocarbons such, for example, as cumene, diethylbenzene, diisopropyl benzene, and trimethylbenzene; and alicyclic hydrocarbons such, for example, as p-methylisopropylcyclohexane and n-butylcyclohexane.

Mixtures of hydrocarbons, such as mixtures of any two or more of the above hydrocarbons, can be satisfactorily employed in carrying out this invention. Commercially available compositions containing one or more hydrocarbons as a substantial component thereof can also be employed such, for example, as kerosene which is a distilled hydrocarbon from petroleum having a boiling point range of from about 150° C. to about 300° C.; paraffin oil (white mineral oil) which is a colorless transparent oily liquid, is a mixture of liquid hydrocarbons, and has a boiling point range of from about 330° C. to about 390° C.; and naphthenic oil.

Thus, in carrying out the method of this invention, hydrophilic silica particles are admixed with the desired hydrocarbon to provide a mixture, and the mixture heated to an elevated temperature of from about 140° C. to about 300° C., but below the boiling point of the hydrocarbon, and maintained at the elevated temperature and contacted with oxygen. Pure oxygen can be used or a gas containing free oxygen as a component thereof such as air. The silica hydrocarbon mixture is maintained in contact with oxygen for a period of time sufficient to convert at least a substantial amount, and preferably all, the silica to hydrophobic silica. The time period will depend, to some extent, on the hydrocarbon used, composition of oxygen containing gas used, and the degree of contact of oxygen with the mixture. The time period will depend also on the temperature used, the time varying inversely with the temperature.

The rate at which the silica is rendered hydrophobic can be increased by dispersing the free oxygen or gas containing free oxygen throughout the heated mixture. Thus means can be used to pass oxygen through the mixture. Catalytic amounts of oxidation catalysts can be added to the mixture prior to contacting the mixture with oxygen. Examples of such catalysts include cobalt naphthanate, manganese naphthanate, and lead naphthanate.

The amount of silica and liquid hydrocarbon used in admixture is dictated by economics and ease of handling. The weight ratio of liquid hydrocarbon to hydrophilic silica can vary from about 50:1 to about 1:5. The preferred range is from about 15:1 to about 1:1. The above ratios can be departed from if desired and are set forth herein as exemplary only.

Pure oxygen can be used in carrying out this invention. Mixtures of gases containing oxygen such, for example, as air can be employed. In carrying out this invention, oxygen or oxygen-containing gas is preferably bubbled through the silica-hydrocarbon liquid mixture whereby a substantial amount of mixture is contacted with oxygen. Agitation of the mixture during oxygen contact with mechanical means, such as a stirrer, will also increase the rate of contact of oxygen with the mixture, thereby increasing the rate at which hydrophobic silica is produced.

The hydrophobic silica produced can be separated by suitable methods known in the solid/liquids separation art such, for example, as by centrifugation and filtration methods. The separated hydrophobic silica can be washed, if desired, by an organic liquid such as hexane, benzene, toluene, or mixtures thereof, to remove substantially all the oil. The hydrophobic silica can then be dried and stored for subsequent known uses such, for example, as in the manufacture of greases.

In addition, the mixture or composition produced by the method of this invention, which will contain as its components hydrophobic silica, hydrocarbon liquid, and oxidized hydrocarbon liquid, can be used as a defoamer without further treatment.

The composition can be diluted, if desired, with addition of a water-insoluble organic liquid which can be the same hydrocarbon liquid originally used in the process, if such were used, or a different liquid such, for example, as a vegetable oil, a long chain alcohol, a long chain ester, a long chain amine, and mixtures thereof. Additional hydrophobic silica can be added to the composition if desired. Satisfactory defoamers will usually contain about 3% to about 20% by weight of hydrophobic silica and preferably from about 8% to about 12% by weight.

Defoaming compositions are preferably dispersed prior to storage, in order to break down any silica agglomerates which may be present. Dispersing the hydrophobic silica in oil increases the efficiency of the defoaming composition. Suitable means for dispersing the defoaming compositions include known dispersing apparatus such as colloid mills, homogenizers, and the like.

Proportions of ingredients in the defoaming compositions can vary widely. In general, efficiencies increase with increased proportions of solids. However, when the proportion of solids is high, handling difficulties are encountered. Therefore, in order to retain fluidity of the product to allow ease in handling during use, the proportion of solids should not exceed about 20% by weight. It is possible to use as little as 1% of solids in a defoaming composition although it is preferred to use at least about 8% solids to maintain good defoaming efficiency.

The following examples are illustrative of this invention. All parts and percentages are by weight unless otherwise specified.

EXAMPLE 1

Forty (40) parts of fumed hydrophilic silica (Cab-O-Sil, M-7), is mixed with 460 parts of a white paraffinic mineral oil (Primol Fractol 205) to provide a mixture which is heated at a temperature of 150° C., under a blanket of air. The mixture is agitated during the heating period. Samples of silica in oil are removed every 30 minutes, diluted with hexane and centrifuged. The hexane wash is repeated three times. After the final wash the samples are dried. The silica produced is checked for hydrophobicity. The silica is partially hydrophobic after 150 minutes of mixing under the air blanket.

EXAMPLE 2

Example 1 is repeated except that the mixture is heated at 250° C. instead of 150° C. The silica is essentially all hydrophobic after 60 minutes at this temperature.

The following example illustrates that silica can be made hydrophobic utilizing high weight ratios of hydrophilic silica to mineral oil.

EXAMPLE 3

Sixteen (16) parts of hydrophilic silica aerogel (Sant-O-Cel, 62) is mixed with four parts white paraffinic mineral oil (Primol Fractol 205) under a blanket of air. The mixture is agitated with a stirring paddle at a temperature of 200° C. Samples are taken after one hour and washed with hexane and centrifuged three times. Samples of silica taken after one hour are hydrophobic.

The following example is illustrative of the increased rate at which the hydrophilic silica can be made hydrophobic, by substantially more intimate contact of air and silica-oil mixture during heating at elevated temperatures.

EXAMPLE 4

Eighteen (18) parts of a precipitated (hydrophilic) silica (Hi-Sil 233) is mixed with 180 parts of a white paraffinic mineral oil (Primol Fractol 205). Air is dispersed through the mixture while holding the temperature of the mixture at about 200° C. After 30 minutes a sample is removed, washed twice with hexane, centrifuged and dried. The silica is hydrophobic.

EXAMPLE 5

Ninety (90) parts of the product of Example 4 is thoroughly agitated to remove agglomerates and to thoroughly disperse the hydrophobic silica throughout. One part of the homogeneous mixture is added to 3000 parts of a foaming hot black pulp mill liquor. The foam level of the foaming liquid is substantially reduced.

EXAMPLE 6

Forty (40) parts of fumed silica (Cab-O-Sil, M-7) is mixed with 460 parts of white paraffinic mineral oil (Primol Fractol 205). The mixture is heated to 250° C. and agitated under a blanket of air for 150 minutes. The silica produced is hydrophobic. One hundred and fifty (150) parts of a hot black pulp mill liquor are shaken at 80° C. in a 250 ml. graduated cylinder whereby substantial foam is produced. About 5¾ inches of foam is produced above the level of the liquid in the cylinder. To the foaming liquid is added 0.025 (166 p.p.m.) part of the composition of this example. Shaking is continued and foam level is measured as a function of time. Results are set forth in Table 1 below:

TABLE 1

| Time after addition of hydrophobic silica in oil: | Foam level (inches) |
|---|---|
| 5 sec. | 1 |
| 20 sec. | 1⅝ |
| 1 min. | 2 |
| 2 min. | 2¼ |
| 3 min. | 2½ |
| 4 min. | 2⅝ |
| 5 min. | 2¾ |

EXAMPLE 7

Eight (8) parts of precipitated hydrophilic silica is mixed with 92 parts of a naphthenic mineral oil at a temperature of 250° C. Air is dispersed through the mixture and samples are taken after 60 minutes and 90 minutes. The samples are washed twice with hexane, centrifuged and dried. The silica sample taken after 90 minutes reaction is hydrophobic. About 0.1 part of this composition is added to 150 parts of a foaming hot black liquor (foam level, about 5¾ inches) which is shaken in a 250 ml. graduate. Shaking is continued and foam level is measured as a function of time. Results are set forth in Table 2 below:

TABLE 2

| Time after addition of hydrophobic silica in oil: | Foam level (inches) |
|---|---|
| 5 sec. | 1¾ |
| 20 sec. | 1¾ |
| 1 min. | 2 |
| 2 min. | 2 |
| 3 min. | 2 |
| 4 min. | 2 |
| 5 min. | 2½ |

It is to be understood that the above description is illustrative of the invention and not in limitation thereof.

What I claim and desire to protect by Letters Patent is:
1. A method which comprises preparing an admixture of hydrophilic silica and a water-insoluble hydrocarbon having a boiling point above about 140° C. and which said hydrocarbon is a liquid at a temperature of from about 140° C. to about 300° C., and, while maintaining the admixture at a temperature of from about 140° C. to about 300° C., contacting the said admixture with oxygen for a period of time sufficient to convert a substantial proportion of the hydrophilic silica to hydrophobic silica whereby there is provided a composition comprised of hydrophobic silica, hydrocarbon, and oxidized hydrocarbon.

2. The method of claim 1 wherein the hydrocarbon is a liquid at room temperature.

3. The method of claim 1 wherein the hydrocarbon is paraffinic mineral oil.

4. The method of claim 1 wherein the hydrocarbon is naphthenic mineral oil.

5. The method of claim 1 wherein the hydrophilic silica is fumed silica.

6. The method of claim 1 wherein the hydrophobic silica is silica aerogel.

7. The method of claim 2 wherein the silica is silica aerogel.

References Cited

FOREIGN PATENTS 725,071   Canada _____ 117—100S

JOHN D. WELSH, Primary Examiner

U.S. Cl. X.R.

117—100; 106—308; 252—358